United States Patent [19]
Dickens

[11] 3,831,965
[45] Aug. 27, 1974

[54] VEHICLE SUSPENSION SYSTEM
[76] Inventor: Charles V. Dickens, P.O. Box 544, Alamosa, Colo. 81101
[22] Filed: Jan. 15, 1973
[21] Appl. No.: 323,884

[52] U.S. Cl........ 280/96.2 R, 267/20 R, 280/112 A
[51] Int. Cl.............................................. B60g 3/04
[58] Field of Search....... 280/96.2 R, 112 R, 112 A, 280/124 R; 267/20 R, 20 A

[56] References Cited
UNITED STATES PATENTS

| 2,043,889 | 6/1936 | Erb | 267/20 R |
| 2,200,798 | 5/1940 | Megow | 280/112 A X |
| 2,512,057 | 6/1950 | Fowler | 267/20 A |
| 2,755,098 | 7/1956 | Jochumsen | 280/112 R X |
| 3,261,621 | 7/1966 | Corbin | 280/112 R X |
| 3,598,385 | 8/1971 | Parsons | 280/96.2 R X |

*Primary Examiner*—Kenneth H. Betts
*Attorney, Agent, or Firm*—Edwards, Spangler, Wymore & Klaas

[57] ABSTRACT

This invention relates to a suspension system for automotive vehicles and the like characterized by front and rear pairs of hingedly interconnected dogleg frame elements that coact with one another and with an overhead centrally located longitudinal hinge axis to minimize tilt and sway by transferring the sidewise loads inducing the latter across the vehicle to the springs on the opposite side.

10 Claims, 15 Drawing Figures

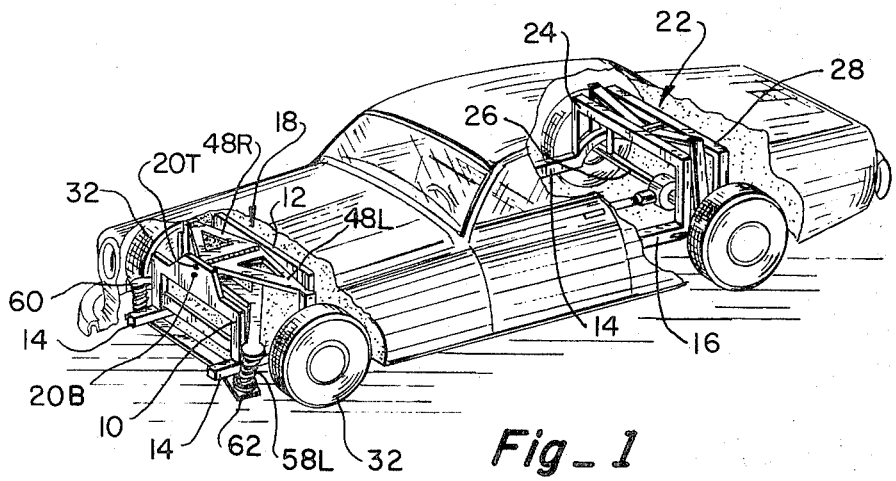
Fig_1
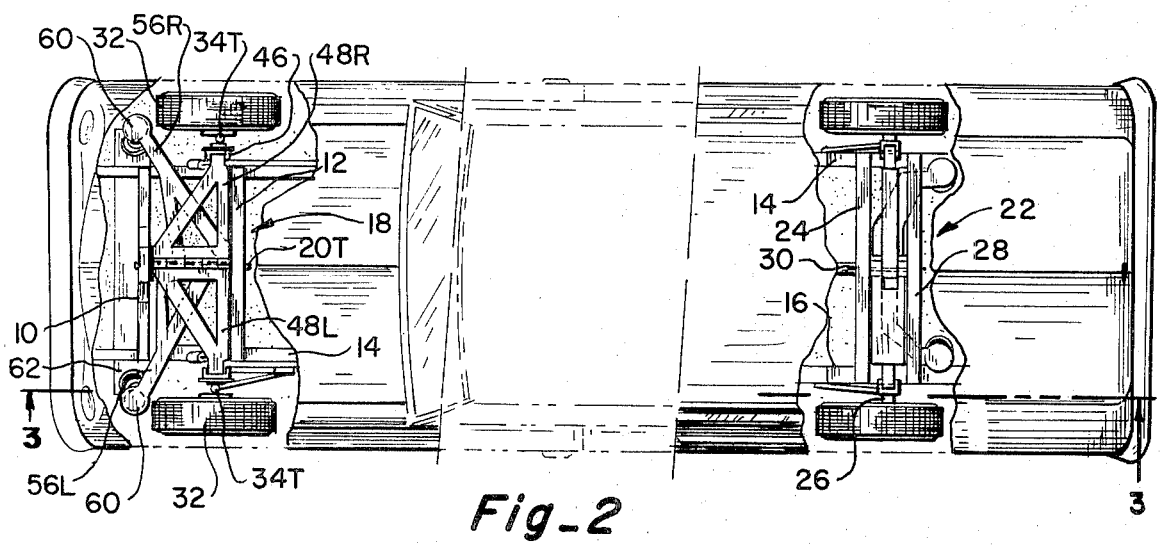
Fig_2
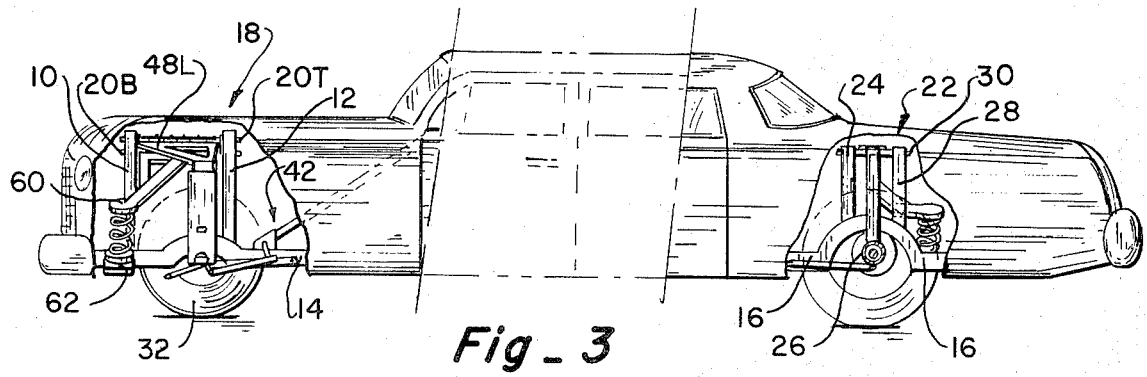
Fig_3

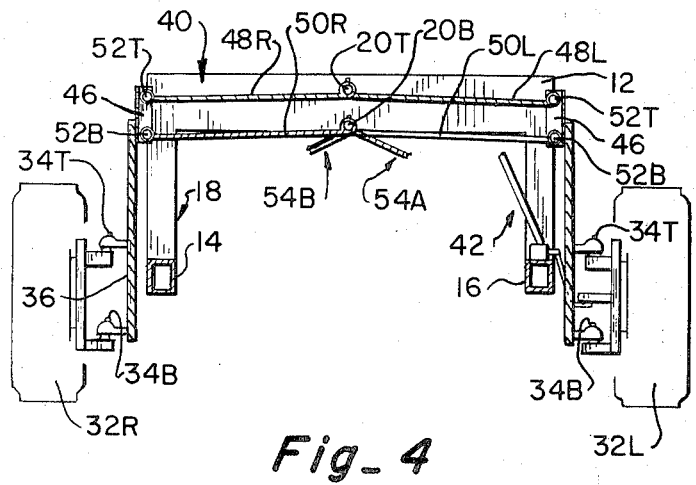
Fig_4
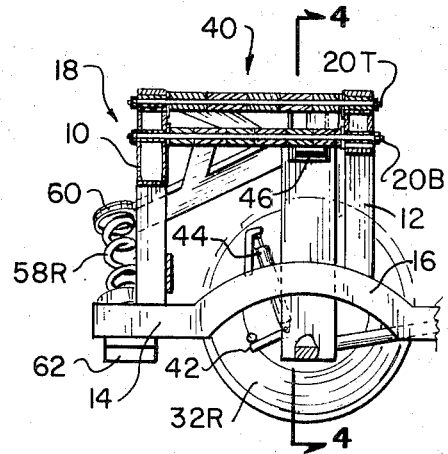
Fig_5
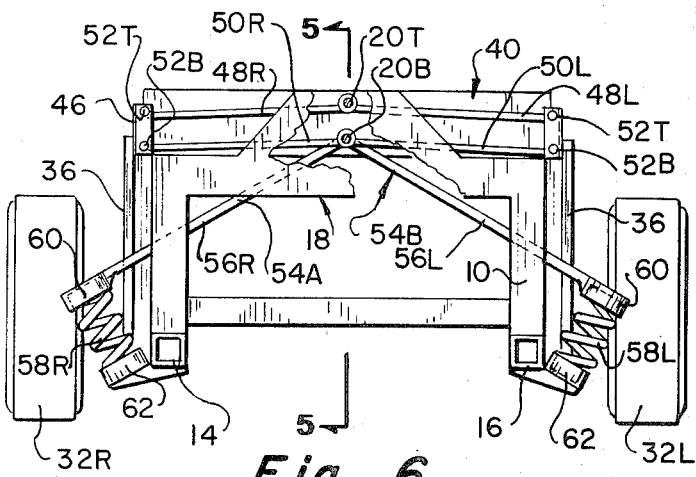
Fig_6
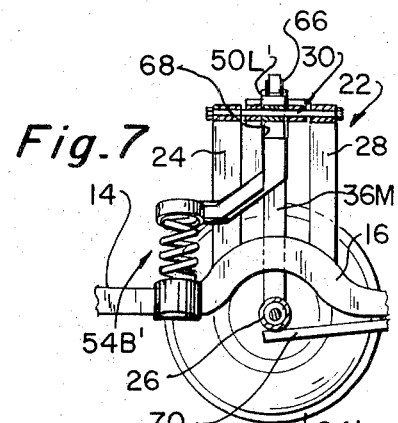
Fig_7
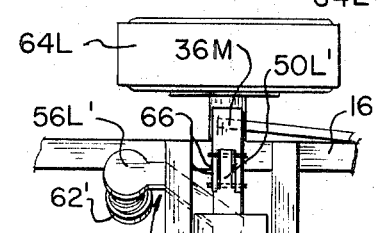
Fig_8
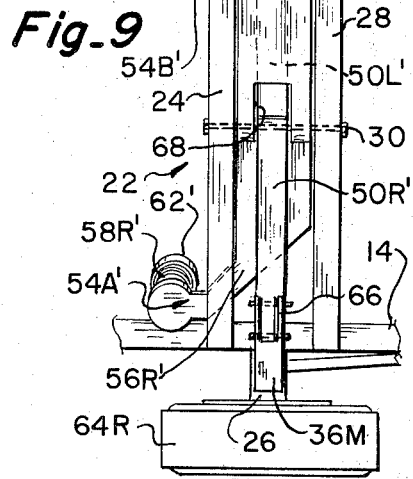
Fig_9

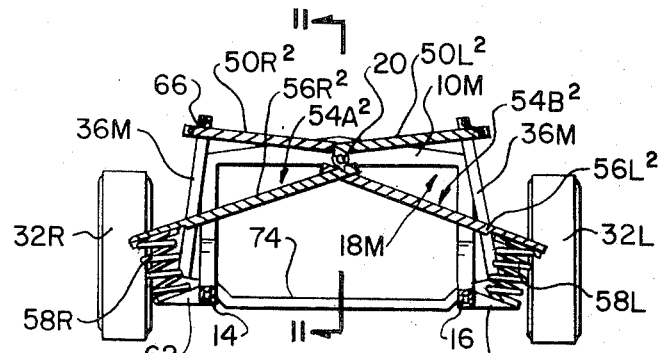
Fig_10
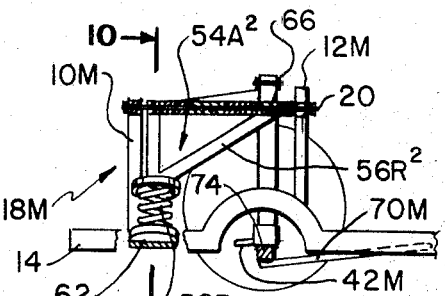
Fig_11
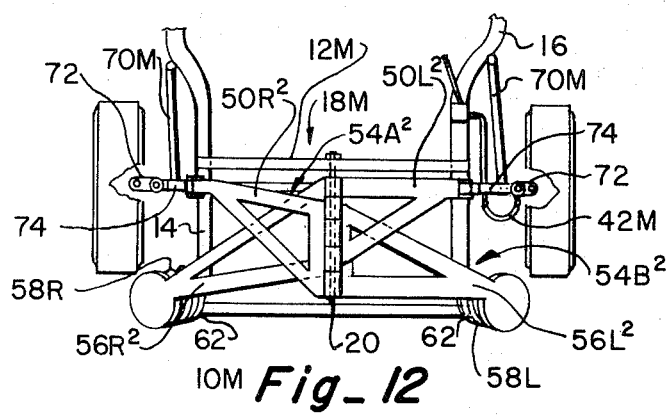
Fig_12
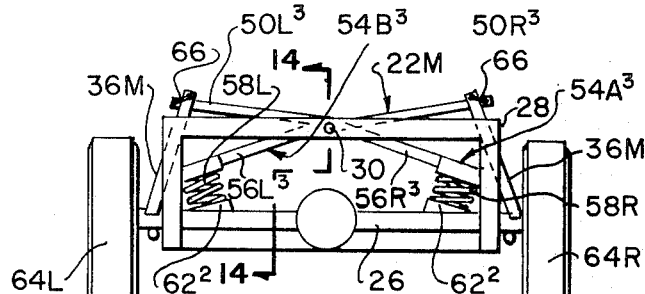
Fig_13
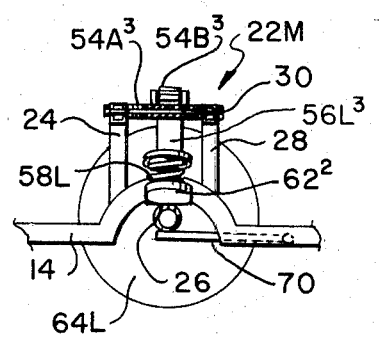
Fig_14
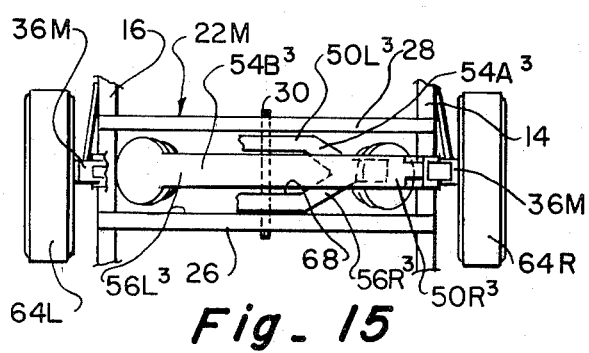
Fig_15

VEHICLE SUSPENSION SYSTEM

The basic concept that has been followed in the design of spring suspension systems for wheeled vehicles has almost universally been to mount the frame atop springs of the leaf or coil type and then mount substantially all of the remaining elements on top of the frame. The net result of such a system is to create a top heavy mass that has a pronounced tendency to tilt over toward the outside of a turn upon the application of any substantial sidewise forces. Continuing attempts are being made to solve or at least lessen the effect of this problem, the most successful of which are found on racing cars which have an extremely wide wheel base coupled with a very low center of gravity that effectively lessens the tendency to tip over when negotiating a turn at high speed. Unfortunately, effective as these measures are, they become extremely impractical when efforts are made to apply the same principals to a passenger vehicle.

It has now been found in accordance with the teaching of the instant invention that much of the stability found in the modern day racing car can be realized in the ordinary passenger vehicle by the simple, but unobvious, expedient of erecting rigid archlike overhead frame elements at both the front and rear ends of the vehicle that cooperate to define a centrally located longitudinally extending hinge axis about which two pairs of dogleg arms pivot. The center of mass of the vehicle along with substantially all of its massive parts lie underneath this longitudinally extending overhead hinge axis and it is this arrangement along with the dogleg arms that causes the suspension system to perform as intended.

In one version of the system where the wheels are journalled at opposite ends of a rigid axle such as at the rear end of most passenger vehicles, a single hinge axis is used; however, in the absence of such an axle a parallelogram system in the horizontally disposed branches of the dogleg arms is used to maintain the proper relationship between the wheels which are free to move up and down independently of one another as is true of most steerable wheels. This also calls for a stronger structure in the arch as the direct horizontal connection between the wheels is no longer present. Despite these differences in construction, both of which are very often used on the same vehicle, the function of transferring the sidewise loads to the springs on the inside of the turn remains essentially the same.

Conventional steering systems are entirely compatible with the spring suspension system of the present invention as are the drive trains. In fact, front-wheel, rear-wheel and 4-wheel drives can all be used equally well with the instant suspension system.

It is, therefore, the principal object of the present invention to provide a novel and improved spring suspension system for automotive vehicles and the like.

A second objective of the invention forming the subject matter hereof is the provision of a unique mechanism for reducing the roll associated with sidewise loads.

Another object of the within described invention is to provide a hinged system of overhead dogleg arms that shift sidewise loads to the side of the vehicle opposite to that in which the load is acting where it is absorbed by the spring on said side.

Still another objective of the present invention is the provision of a system of the type aforementioned that is entirely compatible with the conventional drive and steering system.

An additional object of the invention herein disclosed and claimed is the provision of a suspension system designed around an overhead longitudinally extending hinge axis that is well above the center of mass of the vehicle.

Further objects are to provide a spring suspension system that is versatile, safe, reliable, rugged, strong, relatively simple and easy to service.

Other objects will be in part apparent and in part pointed out specifically hereinafter in connection with the description of the drawings that follows, and in which:

FIG. 1 is a perspective view looking down and to the right upon a passenger automobile equipped with the spring suspension of the present invention, portions of the body having been broken away to reveal the latter;

FIG. 2 is a top plan view of the vehicle to a slightly larger scale, portions of the body having been broken away;

FIG. 3 is a fragmentary side elevation to the same scale as FIG. 2, once again with portions of the body broken away to reveal the interior construction;

FIG. 4 is a transverse section to a still further enlarged scale taken along line 4—4 of FIG. 5 showing a steerable front suspension;

FIG. 5 is a longitudinal section taken along line 5—5 of FIG. 6 to the same scale as the latter;

FIG. 6 is a front elevation similar to FIG. 4 except that the springs, frame supports therefor and actuating legs of the hinged arms are also revealed;

FIG. 7 is a fragmentary section taken along line 7—7 of FIG. 8 showing the slightly simpler rear suspension system made possible by the solid rear axle;

FIG. 8 is a rear elevation of the rear suspension system of FIG. 7;

FIG. 9 is a fragmentary top plan view of the rear suspension system;

FIG. 10 is a transverse section taken along line 10—10 of FIG. 11 and to a slightly reduced scale showing a modified and somewhat simplified steerable front suspension system of the type that can be used when both steerable front wheels are mounted on opposite ends of the same solid axle;

FIG. 11 is a fragmentary longitudinal section taken along line 11—11 of FIG. 10;

FIG. 12 is a fragmentary top plan view of the front suspension of FIGS. 10 and 11;

FIG. 13 is a rear elevation of a modified form of rear suspension in which the springs are mounted on pads atop the axle instead of being offset rearwardly thereof;

FIG. 14 is a fragmentary longitudinal section taken along line 14—14 of FIG. 13; and, FIG. 15 is a fragmentary top plan view of the modified rear suspension of FIGS. 14 and 15.

Referring next to the drawings for a detailed description of the present invention and, initially, to FIGS. 1, 2 and 3 for this purpose, it will be noted that a front pair of longitudinally spaced parallel arch forming members 10 and 12 are mounted atop the sideframe elements 14 of the main frame 16 to define a front subframe that has been designated broadly by reference numeral 18. The latter subframe is housed within the engine compartment underneath the hood with the front arch 10 positioned slightly ahead of the engine and the rear arch 12 going over the top of the latter so that the axes about which the wheels turn lie therebetween. This subframe is rigid and its sole function is to support the extremities of hinge pins 20T and 20B that define a longitudinally extending centrally located substantially horizontal axis of pivotal movement lying well above the center of mass of the vehicle.

A second similar subframe indicated in a general way by reference numeral 22 is located at the rear end of the vehicle astraddle the same sideframe elements 14 of the main frame. The front arch 24 of the rear subframe lies forwardly of the rear axle 26 while the rear arch 28 is behind the latter. These arches extend transversely across the vehicle in longitudinally spaced substantially parallel relation to one another where they function as supports for centrally located longitudinally extending hinge pin 30. The axis defined by this hinge pin is substantially horizontal and, in fact, preferably collinear with that defined by the front hinge pin, the axis defined thereby lies well above the center of mass of the vehicle.

Next, with particular reference to FIGS. 1–6, the parallelogram version of the front suspension system will be described in detail. In this embodiment the front steerable wheels 32 are mounted for pivotal movement about a substantially vertical axis defined by upper and lower ball joints 34T and 34B depending from the outside of vertical uprights 36. Uprights 36 parallel one another and are connected together at their upper ends by a parallelogram subassembly that has been designated broadly by reference numeral 40 and which will be described in detail presently. Before proceeding with a description of the latter, however, it should be noted that the left front wheel is connected to a conventional steering linkage that has been designated in a general way by reference numeral 42. No attempt has been made to illustrate the steering subassembly in detail as it may assume any one of several well known configurations and it forms no part of the present invention. The right front wheel would, of course, be operatively linked to the left by a conventional tie rod subassembly (not shown). Shock absorbers 44 (FIG. 5) are interposed between the frame 16 and a vertically movable element of the suspension system associated with a wheel.

Returning once again to the parallelogram subassembly 40, it will be seen that the upper extremities of uprights 36 are each provided with an inwardly opening channel shaped bracket 46 within which the outer extremities of parallel arms 48 and 50 are mounted for pivotal movement about vertically spaced longitudinally extending parallel axes 52B and 52T. Upper arms 48R and 48L are each independently joined at their inner ends to upper hinge pin 20T, the axis of which parallels that of lower hinge pin 20B in spaced relation thereabove. The pivotal connections 52B and 52T on each side cooperate with the common hinge pins 20B and 20T, the several supports therefor and arms 48 and 50 to define the parallelogram subassembly 40. Note that one such subassembly is located on the right side of the vehicle and a second one on the left, each operating independently of the other despite the fact that they employ common hinge pins 20T and 20B.

Right and left arms 48R and 48L define hinge leaves while lower arms 50R and 50L mounted on pin 20B comprise but one section of a rigid dogleg spring actuating member that has been designated in a general way by numerals 54A and 54B and which includes a second section 56, the outer extremity of which rests atop coil spring 58, all of which is most clearly revealed in FIGS. 1–3, 5 and 6 to which reference will now be made. Sections 56R and 56L of the dogleg elements extend forwardly as shown in FIGS. 1, 2 and 3 where the outer extremities are provided with downwardly opening cup shaped pockets 60 adapted to receive and retain the upper ends of the springs. The lower ends of the spring are retained in sockets sized to receive same provided in feet 62 depending from longitudinal elements 14 of the main frame 16. Thus, dogleg member 54A is made up of sections 50L and 56R that cooperate to load and unload the spring 58R on the right side of the vehicle in response to changes in position of the left front wheel 32L relative to the frame. Similarly, rigid dogleg element 54B comprises sections 50R and 56L that act in a like manner to load and unload left side spring 58L in response to changes in the relation of right steerable wheel 32R relative to the main frame.

FIG. 6, to which reference will now be made, best illustrates the action of the suspension system. When both steerable wheels rise up relative to the frame simultaneously as in going over a curb or the like, wheel 32R will act through its upright 36 and the dogleg subassembly 54B operatively associated therewith to further compress left front spring 58L while the left front steerable wheel is operating through its analogous linkage to compress spring 58R on the right front corner of the suspension. The net result is to compress both springs equally thus dampening the shock much in the same way as a conventional suspension system. It is when the vehicle is turning a corner that the instant suspension system has its maximum effect in reducing the tendency to roll that ordinarily accompanies such a maneuver.

Accordingly, consideration will next be given to what happens as the vehicle turns a corner. For the purposes of the accompanying explanation, it will be assumed that a left turn is being made. Now, the normal tendency is, of course, for the wheel on the inside of the turn, the left in this instance, to leave the ground and lose traction as the body tends to roll to the right (outside of the turn) under the influence of centrifugal force acting thereon. With the instant suspension system, on the other hand, this does not take place. Instead, the mass supported on the frame tends to swing pendulum-fashion toward the outside of the turn underneath hinge pins 20B and 30 acting as overhead axes of pivotal movement. Thus, if we look at FIG. 6 by way of example, the left side of the frame adjacent left wheel 32L will drop down while the right side rises up. As the right side lifts, it compresses spring 58R which, in turn, acts through elements 56R and 50L of dogleg arm 54A and upright 36 on the left side to press left wheel 32L back down against the roadway. At the same time that spring 58R is being compressed, the frame is dropping away from spring 58L thus lessening the preload compression thereon. When this occurs, dogleg arm 54B acts through the right upright 36 to reduce the load tending to keep the right wheel 32R on the roadway. The net result of this suspension action is to stabilize the body in a turn and keep it essentially level rather than allowing it to roll toward the outside as is customary with conventional spring suspension systems.

Perhaps the simplest way to look at the action of the system is to realize that whenever a wheel raises up relative to the main frame and load carried thereby, the upright and dogleg member operatively associated therewith react to press down on the opposite side of the vehicle thus minimizing the displacement of the wheels relative to the frame on both sides and tending to maintain a stabilized equilibrium condition. The same thing, of course, happens at both the front and rear ends of the vehicle and it remains stable and essentially level even when turning at speeds where the same vehicle equipped with the ordinary spring suspension system would be dangerously close to going out of control and turning over. A glance at FIG. 8 will reveal that exactly the same action is taking place at the rear end of the vehicle.

Next, with specific reference to FIGS, 7, 8 and 9, the analogous system at the rear end of the vehicle will be set forth in detail. Here, since the rear wheels 64R and 64L are both journalled for rotation on the oppsite ends of axle 26 and do not move relative to one another in the manner of the front steerable wheels, the suspension system can be simplified considerably by eliminating the need for the parallelogram arrangement just described. Instead, the modified uprights 36M merely have their lower ends resting atop axle 26 to which they are fixedly fastened while the upper bifurcated ends thereof connect to the slightly modified arms 50R' and 50L' of the rigid dogleg spring actuating members 54A' and 54B' by means of links 66. Once again, as the right rear wheel raises up relative to the frame, it acts through upright 36M, on the right side and dogleg member 54B' attached thereto by link 66 to compress compression spring 58L on the left side. In other words, as the free end of arm 50R' is elevated, it swings about pivot 30 to lower section 56L' thereof and press down on spring 58L which is supported on frame foot 62'.

As seen in FIGS. 7 and 9, dogleg member 54A' extends the full width of the space between arches 24 and 28 and it has an opening 68 therethrough over the hinge pin 30 within which the narrower dogleg member 54B' moves and is hingedly mounted. Both dogleg members have their sections 56R' and 56L' extending rearwardly of the axle to the pockets 62' on the main frame where the springs are supported. Elements 70 extend rearwardly from the undersurface of the main frame to the axle 26 thus providing a conventional tie rod that limits the excursion of the latter relative to the former to essentially up and down motion.

Referring next to FIGS. 10, 11 and 12, a slightly modified and much simplified front suspension system has been shown for use on vehicles equipped with steerable wheels journalled for rotation on stub shafts 72 pivotally attached to the ends of an axle 74. The resulting suspension system is very much like that which was just described in connection with FIGS. 7, 8 and 9 for use on the rear. Uprights 36M remain much the same and they are operatively connected to further modified arms $50R^2$ and $50L^2$ by links 66 as before. The latter arms of further modified dogleg members $54A^2$ and $54B^2$, while slightly different in shape from their counterparts 50R and 50L of FIGS. 1–6 as well as 50R' and 50L' of FIGS. 7–0, nevertheless function in the same way and 7–9, leaves of a hinge on hinge pin 20. The same is true of the lower sections $56R^2$ and $56L^2$ of these dogleg elements as they differ only in shape from those already described but not in function. The springs 58, the feet 62 supporting the latter and the inverted cup shaped retainers 60 at the ends of the dogleg elements remain essentially unchanged. Steering system 42M while different from that broadly disclosed in FIGS. 4 and 5, nevertheless remains conventional and no part of the present invention. Functionally, the modified tie rods 70M that attach the axle 74 to the main frame in a manner to allow vertical relative movement therebetween but no relative motion to and fro remain the same.

Essentially, therefore, the front suspension system 18M of FIGS. 10, 11 and 12 differs from that of FIGS. 1–6 in that it eliminates the more complex parallelogram arrangement required when each steerable wheel can move independently of the other due to the elimination of axle 74. When such an axle is present as it is in certain passenger cars and light trucks, the parallelogram system is no longer needed; however, functionally, both systems respond on exactly the same way for all practical purposes.

Finally, with brief reference to FIGS. 13, 14 and 15, a modified form of the rear suspension system 22M will be set forth in detail. The main difference is that the springs 58 rest atop pads $62^2$ that, in turn, sit atop the rear axle 26 thus placing them in alignment with the latter rather than offset rearwardly thereof. Uprights 36M remain the same as do the links 66. This change in the location of the springs necessitates their being moved in toward one another as shown and it also enables the dogleg elements $54A^3$ and $54B^3$ to be simplified somewhat as shown most clearly in FIG. 15. Element $54B^3$ is pivotally mounted on hinge pin 30 for independent relative movement within the opening 68 in arm $50L^3$ of element $54A^3$ in much the same manner as the dogleg elements shown in FIG. 7, the primary difference being that the lower sections $56R^2$ and $56L^2$ of the latter extended rearwardly while the analogous counterparts $56R^3$ and $56L^3$ of the latter remain in line with the axle.

In this embodiment in contrast to those described in connecton with FIGS. 1–12, inclusive, while we have a somewhat different construction in that the inboard springs are compressed against the axle rather than the main frame, we still have a system wherein the main frame and elements of the vehicle supported thereon are hung pendulum-fashion from the hinge pin 30 and thus, functionally, both systems operate much alike. In closing, it should also be pointed out that the suspension system disclosed and claimed herein provides superior braking action due to the lowering of the vehicle's center of mass to a point beneath the hinge pin axes 20 and 30. In a braking situation, instead of the rear end tending to rise up as is the usual case, the mass tends to swing under the rear hinge pin axis 30 thus driving the rear wheels down against the roadway.

What is claimed is:

1. The spring suspension system for automotive vehicles which comprises: a main frame having longitudinally extending sideframe elements interconnected by crossframe elements positioned and adapted to support an engine, transmission, body and steering mechanism; front and rear subframes each including front and rear rigid arch forming members bridging the sideframe elements of the main frame in longitudinally spaced relation to one another; at least one hinge pin spanning the gap between the front and rear arc forming members of each subframe positioned to define horizontally disposed axes extending longitudinally of the main frame midway between the side margins thereof and above the center of mass of the components supported thereon; rear axle means independent of the main frame located beneath the rear hinge pin intermediate the front and rear arch forming members of the rear subframe, said axle means cooperating with the main frame to define an undercarriage; a pair of rear wheels journalled for rotation on opposite ends of the axle means; a steerable subassembly including a pair of stub shafts operatively connected to the steering mechanism for coordinated movement independent of the main frame about vertical axes located in transversely spaced relation between the front and rear arch forming members of the front subframe; a pair of steerable wheels journalled for rotation on the stub shafts of the steerable subassembly; front and rear pairs of coiled compression springs supported on the undercarriage in upstanding relation adjacent each of the four wheels; and, means comprising a spring actuating subassembly operatively interconnecting each wheel with the spring at the same end of the vehicle but on the opposite side thereof, said subassembly including rigid uprights connected to each wheel for movement therewith up and down relative to the main frame, and front and rear pairs of rigid dogleg elements mounted on the front and rear hinge pins for independent pivotal movement relative to one another, said dogleg elements having one extremity pivotally connected to the adjacent upright and its opposite extremity supported atop the spring on the opposite side of the vehicle in preload relation thereto, and said dogleg elements cooperating with the overhead axes of pivotal movement and the uprights to further compress the spring on one side of the vehicle in response to relative movement between the main frame and wheel on the opposite side of the vehicle in a direction to lower the former with respect to the latter.

2. The spring suspension system as set forth in claim 1 in which: the springs are mounted on the main frame.

3. The spring suspension system as set forth in claim 1 in which: the rear pair of springs are mounted atop the axle means.

4. The spring suspension system as set forth in claim 1 in which: the axes of pivotal movement defined by the hinge pins are collinear.

5. The spring suspension system as set forth in claim 1 in which: a second front hinge pin spans the gap between the front and rear arch forming members of the front subframe in spaced parallel relation above the first; the steerable subassemblies are connected to the lower ends of the front uprights for pivotal movement relative thereto about the vertical axes; and, in which rigid arms are pivotally connected at their opposite extremities between the upper hinge pin and the upper ends of the front uprights in spaced parallel relation above the leg of the dogleg element pivotally connected to the latter, said arms cooperating with said leg of the dogleg element paralleling same and with the pivotal connections at the extremities thereof to define parallelogram linkages operative to maintain the front uprights in transversely spaced parallel relation as they move up and down independently of one another relative to the main frame.

6. The spring suspension system as set forth in claim 1 in which: both of the rear uprights are rigidly connected to the axle means for movement therewith relative to the main frame; and, in which a link forming means interconnects the upper end of said upright with the end of the adjacent leg of the dogleg element.

7. The spring suspension system as set forth in claim 1 in which: the steerable subassembly includes a transversely extending axle having the stub shafts pivotally attached to opposite ends thereof; the front uprights are rigidly connected to the axle inboard of said stub shafts for movement therewith relative to the main frame; and, in which link forming means interconnect the adjacent ends of the front uprights and the dogleg elements.

8. The spring suspension system as set forth in claim 2 in which: the springs are mounted on the sideframe elements of the main frame forwardly of the wheels; and, in which the spring engaging legs of the dogleg elements are downwardly and forwardly inclined relative to the hinge pin pivotally mounting same.

9. The spring suspension sysem as set forth in claim 5 in which: a tie rod pivotally interconnects the lower ends of the front uprights.

10. The spring suspension system as set forth in claim 7 in which: both of the rear uprights are rigidly connected to the axle means for movement therewith relative to the main frame; and, in which a link forming means interconnects the upper end of said upright with the end of the adjacent leg of the dogleg element.

* * * * *